April 21, 1970 SHOICHI KURODA 3,508,143
OSCILLATOR TYPE ELECTRICAL APPARATUS INCLUDING OSCILLATION
INTERRUPTION MEANS FOR TESTING INSULATION
OF COILS AND THE LIKE
Filed May 6, 1968

INVENTOR
SHOICHI KURODA
By
ATTORNEYS

United States Patent Office

3,508,143
Patented Apr. 21, 1970

1

3,508,143
OSCILLATOR TYPE ELECTRICAL APPARATUS INCLUDING OSCILLATION INTERRUPTION MEANS FOR TESTING INSULATION OF COILS AND THE LIKE
Shoichi Kuroda, Kamakura-shi, Japan, assignor to Eiwa Electricity Co., Ltd., Tokyo, Japan
Filed May 6, 1968, Ser. No. 726,655
Claims priority, application Japan, June 26, 1967, 42/40,687
Int. Cl. G01r *31/12, 31/06*
U.S. Cl. 324—54
10 Claims

ABSTRACT OF THE DISCLOSURE

An electrical apparatus for testing the insulation of windings and the like includes an oscillator, a voltage doubling rectifier, a vacuum tube voltmeter, a source of low frequency A.C. potential, and a source of D.C. potential. The oscillator includes a thermionic valve having a control grid, a tank circuit, a control grid winding coupled to the tank circuit, and an adjustable resistance connecting the control grid winding to the control grid. A D.C. blocking condenser connects the grid of one tube of the vacuum tube voltmeter to the anode of the oscillator thermionic valve, and the negative terminal of the source of D.C. potential is connected to the junction point between the condenser and the control grid of the vacuum tube of the voltmeter. A diode connects the source of A.C. potential to the control grid of the oscillator thermionic valve and blocks application of the positive half-wave of A.C. potential to such control grid. A secondary coil is inductively coupled to the inductance of the tank circuit and has terminals for interchangeable connection thereto of windings to be tested.

BACKGROUND OF THE INVENTION

Various arrangements have been proposed for testing the insulation of windings and the like. In most of these arrangements, a standard coil, whose insulation is known to be perfect and complete, is first connected to the test apparatus and adjustments made to provide a predetermined reading of the test apparatus. A test coil is then connected to the test apparatus and, if the readings of the latter do not change, the test coil is considered to have satisfactory insulation.

However, known arrangements have disadvantages with respect to their versatility in that, for example, while they may be suitable for testing insulation for faults and the like, they are not suitable to test the insulation of windings to determine the maximun voltage to which the windings can be subjected without damage to the insulation. In addition, known testing arrangements require complicated circuitry and a source of relatively high operating potential.

SUMMARY OF THE INVENTION

This invention relates to electrical apparatus for testing the insulation of windings and, more particularly, to a novel and improved testing apparatus capable not only of testing the insulation of windings for faults and the like but also capable of determining the maximum voltage to which the insulation of a winding may be subjected without failure.

In accordance with the invention, an oscillator is provided including a tank circuit and a thermionic valve having a control grid and a screen grid, in addition to an anode and a cathode. A D.C. operating potential is applied to the anode of the thermonic valve, so that the oscillator operates to produce a potential in a secondary coil inductively coupled to the inductance of the tank circuit. A relatively low frequency A.C. potential is applied to the control grid of the oscillator thermionic valve in such a manner that only the negative half-waves of the A.C. potential source are applied to the grid, whereby the grid permits conduction of the thermionic valve only during positive half cycles of the A.C. potential source. As a result, transient voltages occur in the oscillator and are added to the regular oscillation pulses, producing a relatively high pulse voltage in the tank circuit with a corresponding high pulse voltage in the secondary winding to which a winding to be tested can be interchangeably connected.

An adjustable resistance is connected between a grid winding, coupled to the oscillator tank inductance, and the control grid of the thermionic valve, so that the output voltage of the oscillator may be adjusted. Thereby the voltage of the oscillator can be increased to any desired value, within the limits of the components, to test the maximum voltage to which the insulation of a test winding can be subjected without breakdown.

A vacuum tube voltmeter is provided and the grid of one vacuum tube is connected through a D.C. blocking condenser to the anode of the oscillator thermionic valve. The negative terminal of a source of D.C. potential is connected, through another adjustable resistance, to a junction point between the grid of the one vacuum tube of the voltmeter and the D.C. blocking condenser. Also, an adjustable resistance is provided between the negative terminal of a diode and the control grid of the thermionic valve of the oscillator, the positive terminal of the diode being connected to a source of A.C. potential, so that the diode acts to block the positive half-waves of the A.C. potential from reaching the control grid of the thermionic valve of the oscillator.

An object of the invention is to provide a simplified and improved electrical apparatus for testing the insulation of electrical windings.

Another object of the invention is to provide such a testing apparatus by means of which the insulation may be tested for defects and may also be tested for the maximum voltage to which it can be subjected without breakdown.

A further object of the invention is to provide such an electrical testing apparatus including an oscillator comprising a thermionic valve having a control grid and means to apply, to the control grid, only the negative half-waves of an A.C. source of potential at a relatively low frequency.

Still another object of the invention is to provide such a testing apparatus including a grid winding coupled to the tank circuit of the oscillator and connected through an adjustable resistance to the control grid of the thermionic valve.

A further object of the invention is to provide such a testing apparatus including a vacuum tube voltmeter and a D.C. blocking condenser connecting the grid of a vaccum tube thereof to the anode of the thermionic valve of the oscillator.

Yet, another object of the invention is to provide such a testing apparatus in which transient voltages or phenomena are used to augment the magnitude of the oscillator voltage to provide high voltages at a secondary winding inductively coupled to the tank circuit of the oscillator and to which test windings may be interchangeably connected.

BRIEF DESCRIPTION OF THE DRAWINGS

For an understanding of the principles of the invention, reference is made to the following description of typical embodiments thereof as illustrated in the accompany- In the drawings.

DESCRIPTION OF THE PREFERRED EMBODIMENT

Figure 1:
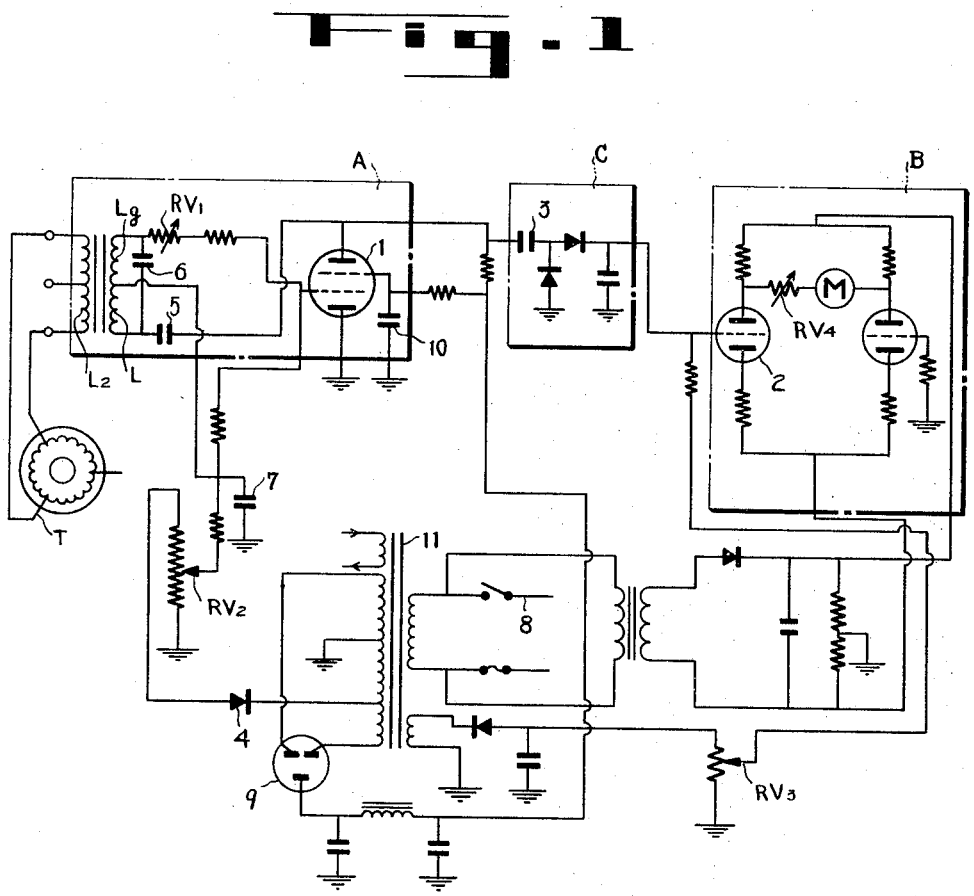
FIG. 1 is a schematic wiring diagram of an electrical testing apparatus embodying the invention.

Referring to FIG. 1, the apparatus of the invention is illustrated as including an oscillator A, a vacuum tube voltmeter B, voltage doubling regulator C, and assosiated sources of A.C. and D.C. potential. The apparatus is illustrated as arranged to test the insulation of a test winding generally indicated at T.

Oscillator A comprises a tetrode thermionic valve, such as a screen grid vacuum tube 1, and a tank circuit including an inductance L and a capacitance 6. Inductance L constitutes a primary winding of a transformer having a secondary winding $L_2$ provided with terminals by means of which windings to be tested can be interchangeably connected across secondary winding $L_2$. It will be noted that winding $L_2$ has a relatively large number of turns and is provided with at least three output terminals so that windings of various ratings can be tested.

A grid winding $L_g$ is coupled to inductance L as by being connected at one end to the latter, and the other end of grid winding $L_g$ is connected through an oscillator voltage regulating adjustable resistance $RV_1$ to the control grid of thermionic valve 1. The tank circuit capacitance 6 connects the opposite end of inductance L to the junction point between grid winding $L_g$ and adjustable resistance $RV_1$, and a D.C. blocking condenser 5 connects the outer end of inductance L to the anode of thermionic valve 1.

Vacuum tube voltmeter B includes a pair of triode thermionic valves, and the grid of triode 2 is connected, through a D.C. blocking condenser 3, to the anode of thermionic valve 1, D.C. blocking condenser 3 forming part of voltage doubling regulator C. In the usual manner, an adjusting resistance $RV_4$ is connected, in series with an indicating meter M, between the anodes of the two triodes of vacuum tube voltmeter B. A source of A.C. potential, at a commercial frequency such as, for example, 50 cycles, is connected at 8 to the primary winding of a transformer 11, and a full wave rectifier tube 9 connected across the terminals of the principal secondary winding of transformer 11 provides a D.C. operating potential which is connected to the annode and scren grid of thermionic valve 1. The screen grid is connected to ground through a condenser 10, and the cathode of thermionic valve 1 is connected directly to ground. A diode 4 such as a germanium diode, has its positive terminal connected to a point on the principal secondary winding of transformer 11, and its negative terminal is connected to one end of an adjustable resistance or potentiometer $RV_2$ whose other end is connected to ground. The adjustable tap of resistance $RV_2$ is connected to the control grid of thermionic valve 1. The junction point between inductance L and grid winding $L_g$ is connected to a junction point between adjustable resistance $RV_2$ and the control grid of thermionic valve 1, and is connected to ground through a low frequency A.C. blocking condenser 7 which serves to pass the oscillator frequency. A further secondary winding of the transformer 11, in conjunction with a diode, such as a germanium diode, and a condenser, provides a source of D.C. potential in parallel with the oscillator output, and the negative terminal of this source is connected, through an adjustable resistance $RV_3$, with a junction point between blocking condenser 3 and the grid of vacuum tube 2.

The secondary winding $L_2$ has a relatively large number of turns and also has a center tap so that it can be used to test windings having various ratings. The diode 4 serves to block the positive half-wave of the A.C. potential from transformer 11 from being applied to the control grid of thermionic valve 1. The voltage doubling regulator C is provided as a well-known voltage doubling regulator for more sensitive voltage regulation, and it will be noted that this regulator C includes a pair of diodes and an additional condenser. The adjustable tap of resistance $RV_3$ is actually connected to the junction point between voltage doubling regulator C and the grid of vacuum tube 2.

In the operation of a testing apparatus as so far described, the oscillating frequency of oscillator A depends substantially, as in a conventional oscillator, upon the constants of its tank circuit, while the oscillating output voltage depends upon the B power supply provided the constants of the tank circuit and of thermionic valve 1 are considered as being at a set value. In addition, the voltage developed across secondary winding $L_2$ may be a fixed voltage if the proper ratio is chosen between inductance winding L and secondary winding $L_2$. The action of the oscillating voltage regulating variable resistance $RV_1$, under these conditions, is believed obvious, so that it is not necessary to explain its operation in detail. Thus, it will be appreciated that the higher the value of resistance $RV_1$, the greater will be the voltage drop between its ends at a constant current, so that the voltage applied to the grid will be decreased causing a decrease in the plate current of thermionic valve 1 and an increase in the plate or anode voltage of valve 1. The reverse occurs when resistance $RV_1$ is adjusted to a lower resistance value.

The voltage across secondary winding $L_2$, which varies in accordance with changes in the adjusted value of adjustable resistance $RV_1$, may be determined as a series of separate observations, and this series of observations may be calibrated on the variable resistance $RV_1$ or at a suitable location, to improve the practical convenience of operating the apparatus.

If a test coil winding T connected to secondary winding $L_2$ has a short circuit, the current consumed in the winding T will increase, due to Ohm's law, up to the rating of the primary winding. Thus, the anode voltage of thermionic valve 1 will increase due to the characteristic of this thermionic valve, even when voltage regulating adjustable resistance $RV_1$ remains at a fixed adjusted value, since the voltage drop between the ends of resistance $RV_1$ will increase.

With respect to diode 4 connected to the control grid of thermionic valve 1 for blocking the A.C. positive half-wave, only the negative half-wave of the low frequency A.C. is applied to the grid of thermionic valve 1. Consequently, the oscillating action is interrupted in response to the application of a negative potential to the control grid. At the following instant, the oscillating action is re-initiated since there is no potential applied to the control grid. The frequency of the interruption and re-initiation corresponds to the low fequency of the A.C. supply. This means that transient phenomena occur in the anode of the thermionic valve 1 at the instant when the valve becomes conductive. This transient phenomenon produces, in the wave form being normally formed by oscillator A, a pulse which results in a higher pulse voltage. The principle is based on the action of oscillator A with respect to the tank circuit thereof.

Figure 2:
FIG. 2 is a graphical illustration of the wave forms developed by the oscillator.
Figure 3:
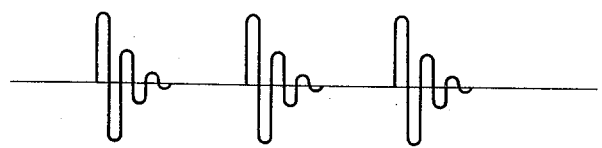
FIG. 3 is a graphical illustration of the transient voltages appearing at the anode of the oscillator thermionic valve.

FIG. 2 illustrates the wave form corresponding only to the action of the low frequency A.C. potential, while FIG. 3 illustrates the wave form corresponding to the transient phenomenon, and actually both wave forms are superposed or added.

The oscillation control voltage regulating variable resistance $RV_2$ is provided for adjusting any transient phenomenon which may occur when the voltage of the B power supply is changed or the thermionic valve is changed. The variable resistance $RV_3$ is adapted to regulate the vacuum tube voltmeter to operate normally when the output of the oscillator A may vary due to some reason.

The test apparatus will now be described with reference to specific values. The voltage of the commercial source of A.C. potential applied at 8 is boosted, through transformer 11, up to about 600 v., and this voltage is applied through rectifier 9 to the tank circuit of oscillator A and to the anode and screen grid of thermionic valve 1. The result is an oscillating frequency of about approximately 1200 cycles. The control grid of thermionic valve 1 is energized, from the commercial source of A.C. potential provided at 8, at 50 cycles and 300 volts, through the germanium diode 4 for blocking the A.C. positive half-wave, and through the oscillator control voltage regulating variable resistance $RV_2$. As a result, a negative voltage at 50 cycles is applied to the grid of thermionic valve 1, which is initially oscillating, and thus a changeover occurs.

As a result, pulses produced due to the transient phenomenon are added to the oscillation pulses. Thereby a voltage several times as high as the normal oscillator voltage is developed in circuit inductance L and a proportionate voltage is developed in secondary coil $L_g$. More specifically, under these conditions an A.C. voltage of about 200 volts is developed in inductance L. In order that this condition correspond to the zero point of vacuum tube voltmeter B, the output of oscillator A should be equalized with respect to the output of the D.C. power supply connected in parallel with the oscillator output. To this end, the negative terminal of the D.C. power supply is connected in parallel, by means of the adjustable resistance $RV_3$.

Testing apparatus embodying the invention can be used for various kinds of measurements of windings. For comparative measurement of a motor field winding or coil having a rating of 100 volts and about 50 turns, a coil or winding of the same type, without any short circuit, is first connected to secondary coil $L_2$ as a "standard" winding or coil. With the standard winding or coil thus connected, a capacity loss should be present to some extent and can be compensated by means of adjustable resistance $RV_3$. After such compensation, the standard coil is disconnected from secondary coil $L_g$, and other motor field windings or coils to be measured may be successively connected to secondary winding $L_g$ in order to compare them with the standard coil and to distinguish acceptable windings from faulty windings. Specifically, when the same value relation is established with respect to this standard coil and the coil or winding being measured, no change will occur in the meter indication and therefore the coil being measured can be considered as a good or acceptable coil. A short circuit, if any, increases the plate voltage of thermionic valve 1, as previously mentioned, and gives rise to a change in reading of voltmeter B so that the short circuit can be readily detected.

When the apparatus of the invention is to be used to measure the durability or maximum rating or a coil or winding, the winding or coil to be measured is connected to secondary winding $L_2$ of oscillator A. Adjustable resistance $RV_1$ is then adjusted to increase the oscillator voltage until a change occurs in the reading of voltmeter B. The moment when the reading changes corresponds accurately to the moment when corona phenomena appear in the winding, resulting in a short circuit. The voltage applied at this instant is indicated by the reading or setting of adjustable resistance $RV_1$, from which reading or setting the durability of the coil or winding being measured can be determined easily.

In order to increase the sensitivity of the apparatus, according to the invention, and especially for measurement of a winding having a relatively large number of turns, the variable resistance $RV_4$ of vacuum tube voltmeter B may be adjusted as necessary in the use of the conventional type of vacuum tube voltmeter.

With the apparatus of the invention, operating as described, a sharp high pulse voltage is obtained in secondary winding $L_g$, so that it is possible not only to detect a short circuit in a winding being tested simply when the coil or winding is connected to secondary winding $L_2$, but also it is possible to determine or measure qualities such as the faultiness and durability of the winding by using the corona phenomenon derived from pin-hole or deficient insulation in the winding, and this can be measured when the voltage is boosted up to a desired level.

The testing apparatus of the invention, in addition, is characterized in that the corona phenomenon may be obtained easily even for measurement of the field winding of a large sized motor having a small number of turns and extremely low impedance, since a pulse voltage, including a plurality of high frequencies, is always present in the apparatus. The test voltage is the pulse voltage and, therefore, the amount of current used is sufficiently small to prevent any damage to the coil being measured and to protect the operator against any possible danger. The testing apparatus can be used efficiently for measurement of newly manufactured coils or windings as well as measurement of used coils or windings such as, for example, motor field windings with respect to aging thereof.

While a specific embodiment of the invention has been shown and described in detail to illustrate the application of the principles of the invention, it will be understood that the invention may be embodied otherwise without departing from such principles.

What is claimed is:

1. Electrical test apparatus, for testing insulation of coils, windings, and the like, said apparatus comprising, in combination, an oscillator including a thermionic valve having a control grid and a tank circuit coupled to the electrodes of said valve; a source of D.C. potential connected to the anode and cathode of said valve and to said tank circuit to activate said oscillator to oscillate at a selected relatively high frequency and a selected voltage; a source of relatively low frequency and relatively high voltage A.C. potential; half-wave rectifier means connecting said A.C. potential source to said control grid with a relative polarity such as to block application, to said control grid, of positive half-cycles of said A.C. potential source to produce transient voltage pulses at the anode of said valve, responsive to re-initiation of oscillation following each negative half-cycle of said A.C. potential, said transient voltage pulses augmenting the oscillator voltage pulses at said anode to provide output pulse voltages which are a multiple of said selected voltage; a secondary coil inductively coupled to the inductance of said tank circuit and having terminals for interchangeable connection thereto of windings to be tested; and meter means connected to the output of said valve and operable to measure the voltage thereacross as a function of the current flow through a winding to be tested.

2. Electrical test apparatus, for testing insulation of coils, windings and the like, as claimed in claim 1, including a grid winding coupled to the inductance of said tank circuit; and an oscillator voltage regulating adjustable resistance connected between said grid winding and said control grid.

3. Electrical test apparatus, for testing insulation of coils, windings and the like, as claimed in claim 1, in which said half-wave rectifier means comprises a germanium diode.

4. Electrical test apparatus, for testing insulation of coils, windings and the like, as claimed in claim 1, in which said meter means comprises a vacuum tube voltmeter including a second thermionic valve having a second control grid, and a D.C. blocking condenser connecting said second control grid to the anode of said first mentioned thermionic valve.

5. Electrical test apparatus, for testing insulation of coils, windings and the like, as claimed in claim 4, in which said D.C. blocking condenser forms a component of a voltage doubling regulator connected between the output of said first-mentioned thermionic valve and the input of said vacuum tube voltmeter.

6. Electrical test apparatus, for testing insulation of coils, windings and the like, as claimed in claim 4, including a second source of D.C. potential having its negative terminal connected to a junction point between said D.C. blocking condenser and said second control grid.

7. Electrical test apparatus, for testing insulation of coils, windings and the like, as claimed in claim 6, in which said second source of D.C. potential is connected in parallel with the oscillator output; a resistance, having an adjustable tap, connected across said second source of D.C. potential; the adjustable tap of said resistance being connected to said junction point.

8. Electrical test apparatus, for testing insulation of coils, windings and the like, as claimed in claim 3, including an adjustable resistance having one terminal connected to said diode and connected, in series with said diode, across said source of A.C. potential, said adjustable resistance having an adjustable tap connected to said control grid.

9. Electrical test apparatus, for testing insulation of coils, windings and the like, as claimed in claim 1, in which said thermionic valve is a tetrode including a screen grid; one terminal of said source of D.C. potential being grounded; and a condenser connecting said screen grid to ground; the cathode of said thermionic valve being connected directly to ground.

10. Electrical test apparatus, for testing insulation of coils, windings and the like, as claimed in claim 2, in which the tank circuit inductance comprises a winding having one terminal connected to one terminal of said grid winding; and an anode power supply D.C. blocking condenser connecting the opposite end of said inductance winding to the anode of said thermionic valve.

References Cited

UNITED STATES PATENTS

| | | | |
|---|---|---|---|
| 2,230,297 | 2/1941 | Inoue | 324—60 |
| 2,579,217 | 12/1951 | Tyzzer | 331—173 XR |
| 3,281,672 | 10/1966 | Kuroda | 324—51 |
| 3,289,074 | 11/1966 | Jones | 324—54 |

GERARD R. STRECKER, Primary Examiner

U.S. Cl. X.R.

331—173